March 8, 1960 A. SALA 2,927,428
GEOTHERMIC CENTRAL PLANT FOR THE PRODUCTION OF ENERGY, WITH
UNCONDENSABLE GASES COMPRESSOR-EXTRACTORS DIRECTLY
OPERATED BY THE ENGINES PRODUCING THE ENERGY
Filed Dec. 27, 1952 3 Sheets-Sheet 3

*FIG. 3*

500 United States Patent Office 2,927,428
Patented Mar. 8, 1960

2,927,428

GEOTHERMIC CENTRAL PLANT FOR THE PRODUCTION OF ENERGY, WITH UNCONDENSABLE GASES COMPRESSOR-EXTRACTORS DIRECTLY OPERATED BY THE ENGINES PRODUCING THE ENERGY

Antillo Sala, Legnano, Italy

Application December 27, 1952, Serial No. 328,172

Claims priority, application Italy January 26, 1952

6 Claims. (Cl. 60—40)

The present invention relates to a geothermic central plant for the production of energy, with uncondensable gases compressor-extractors directly operated by the engines producing the energy.

It is known that to get energy from natural steam, that is generally mixed with uncondensable gases, steam turbine plants are used wherein steam comes directly from underground or from the evaporation of thermal waters extracted from underground (eventually mixed with other steam). To the condenser, therefore, arrive the uncondensable gases that have to be extracted from the condenser after the condensation of the steam to maintain in the latter the highest vacuum possible, and increase, therefore, the thermic head. Each turbine generally drives an alternator. The compressor-extractors carry the gases (mixed with a little steam whose temperature is near that of the cooling water of the condenser) to the pressure of the atmosphere, into which they are generally discharged. In known plants reactive rotary compressors are used, having centrifugal or axial flow, and driven by independent motors or steam turbines. Such plants comprise a certain number of motor-compressor groups (some of them, generally, kept in reserve) connected to a single suction collector. To said collector are in turn connected the condensers of all of the turbo-alternators.

It is an object of the present invention to improve the overall efficiency of such plants by realising a greater constructional simplicity and therefore a simplicity of operation and reliability besides a lower first cost.

The plant according to the invention is substantially characterised by the fact that the compressor-extractor adhibited to each turbine is directly driven by the turbine itself, the several compressors being connected to the suction through valve means, by a common collector to which is also connected at least one motor compressor-extractor reserve group.

The invention is illustrated in a purely indicative and not limitative way in the diagrammatic drawings hereto annexed, in which:

Fig. 3 is another variant of the plant according to Fig. 1, with an air ejector operated by saturated steam.

Figure 1:
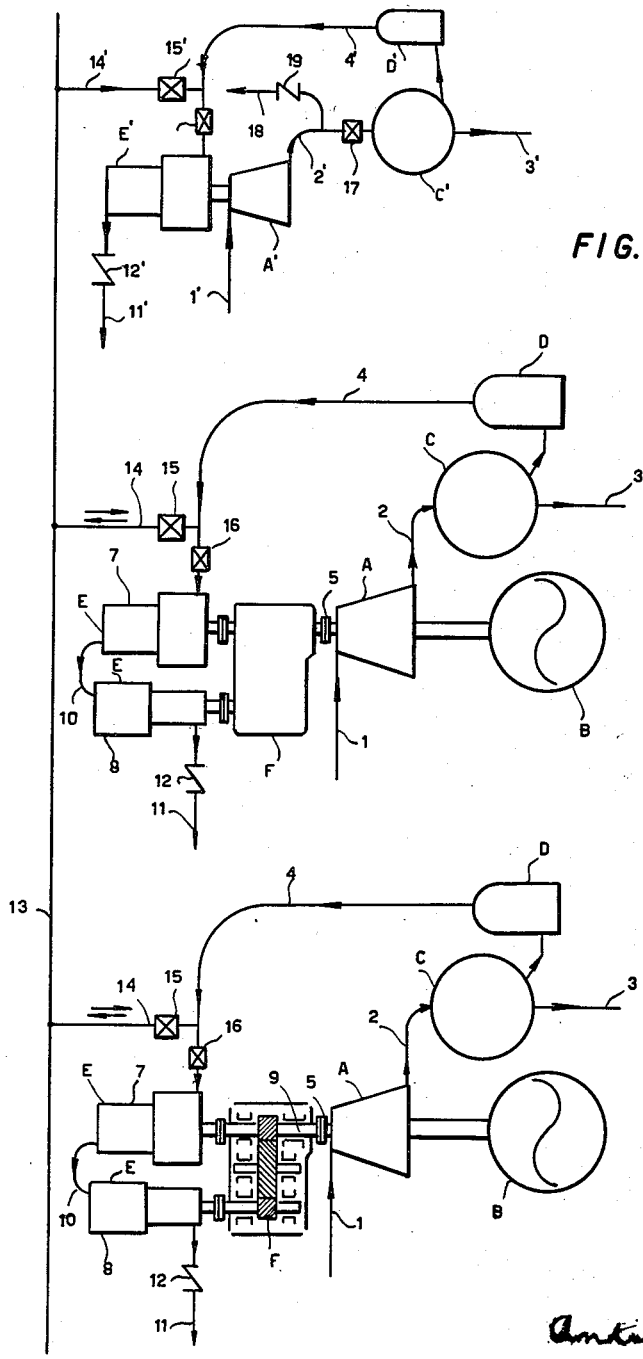
Fig. 1 shows a preferred embodiment of a plant having two turbo-alternator groups and a reserve compressor group.

In Fig. 1, A indicates the main turbines, fed by natural steam through conduits 1. Each turbine operates an alternating voltage generator B directly coupled to it, and discharges the steam into condenser C through conduits 2. The condensed water (or its mixture with the cooling water in the case of mixture condensers) is carried away through conduits 3, while the uncondensable gases go through coolers D from which said gases, cooled off, go through conduit 4 to the compressor-extractor E. The latter is directly driven by turbine A, with the interposition of coupling 5, by means of the end of the turbine shaft opposite the one driving the generator shaft. Coupling 5 is of the disconnectable type while the turbine is at rest or disconnectable with the turbine running.

In the example illustrated each compressor E is constituted by two low pressure pumps 7 in series and a high pressure pump 8. Pump 7 is directly driven by the turbine shaft (shafts co-axial) whilst pump 8 is driven by the turbine through a gear multiplier F consenting an increase in the number of revolutions of the rotor of pump 8 in relation with the reduced volumetric gas output. The primary shaft 9 of the multiplier transmission F is inserted between the co-axial shafts of the turbine and of the low pressure pump 7 of the compressor-extractor E. It is understood, of course, that the compressor E may also have a single, or more than two, pumps; provided that they be driven by turbine A through coupling 5 and with any revolution ratio, referred to each of the pumps of the compressor-extractor. The two stages of the compressor shown in the figure communicate through conduit 10. The gases extracted from the condenser C are dispersed into the atmosphere through conduit 11, into which are inserted the non-return valves 12.

The suction conduit 4 of each compressor is connected to a connecting conduit means 13 through conduit 14 in which is inserted a closure valve means 15. A second valve 16 is inserted in suction conduit 4 between compressor-extractor E and conduit 14.

To connecting conduit means 13 is also connected a reserve unit compressor-extractor that, in the example illustrated, in driven by a turbine also actuated by natural steam. Turbine, compressor and auxiliary organs are indicated by the same reference letters as used for the organs already described, distinguished by an asterisk. Turbine A', of course, drives no generator, being exclusively adhibited to the driving of auxiliary compressor E'.

The latter has, of course, the capacity of working, besides as a reserve group, as will further on be explained, also to serve condenser C' of the turbine that drives it. Between turbine A' and condenser C' is interposed an operatable intercepting closure valve 17 consenting the free discharge of the turbine through conduit 18 provided with a non-return valve 19.

For uniformity's sake, compressor E' may be of the same type as compressors-extractors E (in such a case a multiplying gear similar to F is to be provided between it and the motor, adequately constructed for the number of revolutions of the, or of each, body of the compressor itself.) Such a multiplying gear is not shown in the figure.

Were it necessary for any reason (overhauling, breakdown, maintenance) to put out of service one of the compressors E, and should coupling 5 not be disconnectable while running, its relative turbine A is stopped, valve 16 is closed and coupling 5 disconnected; turbine A' is started, valves 16' and 15' (that under running are closed) are opened, and after obtaining a vacuum in condenser C of turbine A which has been stopped by reserve compressor-extractor E', turbine A that can also run regularly with its own compressor E stopped, is put again in operation.

Should coupling 5 be disconnectable while running, turbine A' (or the motor) is first started, valves 15' and 16' opened, valve 16 of compressor E to be stopped is closed, valve 15 is opened, and then coupling 5 is disconnected while running. Thus the reserve is set into working without stopping turbine A.

Figure 2:
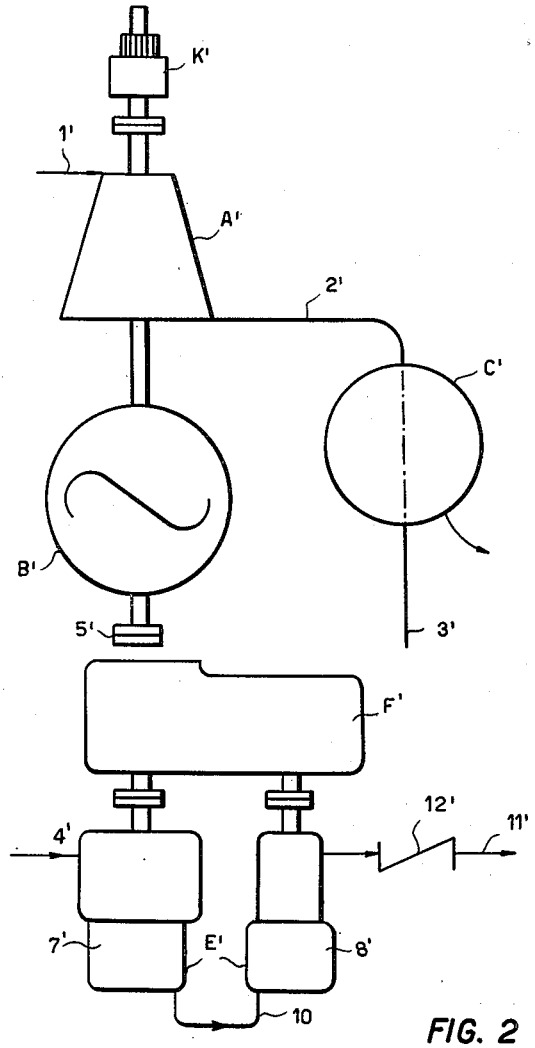
Fig. 2 shows a particular according to a variant of the compressor-extractor drive.

The example of embodiment of Fig. 2 concerns a particular of construction of the plant, and specifically the drive of the compressor-extractor.

In the now described example of Fig. 1, said compressor-extractor connected with the main turbine is driven by the turbine itself by means of the projecting end of its shaft opposite the projecting end of the shaft driving the alternator.

In the example of embodiment of Fig. 2 the compressor-extractor belonging to the group "main steam turbine-driven machine-compressor-extractor" is in fact driven by means of a disconnectable coupling by the rotor shaft of the driven machine opposite to the one connected to the turbine.

In Fig. 2 the parts and organs corresponding to those of the groups driven by the main turbine of Fig. 1 are distinguished by the same reference marks provided with a prime.

A' is the main steam turbine with condenser C'. The turbine drives an alternator B'. The latter in turn drives by the shaft end opposite the one connected with the turbine the compressor-extractor E' which may be single or many-bodied (in the example illustrated it is two bodied—7' and 8'). Compressor-extractor C' is driven, in the constructional solution illustrated, through a reducing or multiplying gear F' of the number of revolutions (for instance, of the toothed gearing type). Between alternator B' and the compressor-extractor, or between the alternator and the revolution multiplier there is a joint disconnectable either when running or standing still.

The alternator's exciting dynamo, when forming a part of the group, is preferably driven with or without the interposition of a speed variator from the end of the turbine's shaft A' opposite the one driving alternator B' (the exciting dynamo being indicated by K' in the drawing).

The other parts of the group and of the plant are substantially as previously described (Fig. 1).

It is clear that with the new invention the reserve compressor-extractor E' might also be left inactive in the occurrence of any one of compressor-extractors E being put out of use, when the operating conditions of the plant be such as to allow, after having previously opened the respective several valves 15, of maintaining in collector 13 and in the various condensers C thus put in communication, a vacuum, even lower than normal, but high enough and such as to consent under charge of all of the main turbo-alternators when, by means of the disconnection of its relative coupling 5 a compressor-extractor should have to be put out of service. In such a case, a further reserve of compressor-extractors would practically become available. It is to be noted, however, that it will always be necessary to install at least one compressor like E' in order to render starting possible should all of the main turbo-alternators installed in the central plant be in a condition of complete inactivity.

With a plant according to the present invention the following advantages over plants of known type would substantially be realised:

(1) An appreciable saving in the steam consumption as referred to the kw./hour delivered by alternator B, on account of the fact that the extractor-compressors driven through couplings 5 by the high powered and therefore high efficiency main turbines, the corresponding power absorbed by said compressors is reduced to a minimum, the losses occurring with the arrangement of known plants being eliminated or reduced, namely:

(a) In the case when the compressor-extractors are driven by electric motors, the losses in the alternator, transformer, electric lines and motor are eliminated;

(b) In the case of independent small turbines driving, the mechanical and thermo-dynamical losses are appreciably increased correspondingly with the lower efficiency of the small turbines in respect to that of the main turbine, as the latter might be of a power from ten to twenty times greater.

(2) A greater simplicity in respect to known systems, due to the absence of electric motors and their transmissions, automatic switches, instrument boards etc., and in the case of a small turbine drive, to the absence of the small turbines themselves and their condensers and automatic switches and all of their accessories, such as water, steam and gas piping, of the delicate control and safety appliances etc. And in both cases, either of electric or steam turbine drive, several automatic apparatus are eliminated that are necessary in order to avoid the serious damages that might occur even to the main turbo-alternator groups, should the electric line be interrupted or the motors be out of order, or in the small turbines, should the compressors be out of order. Said greater constructional simplicity leads in the end to a greater service reliability and to lesser maintenance and supervision expense, mainly on account of the fact that for the same number and power of central main turbines and with the central plant in full operation the number of machines running is considerably reduced.

(3) A considerably lower first cost in respect to the systems used up to the present for the same power and number of main turbo-generator groups, evidently due to the fact that all of the organs enumerated at the preceding number (2) are eliminated, the consequent smaller floor space required by the machinery leads to an economy in the cost of building the central house.

In the variant of Fig. 3, in which the organs corresponding to those of Fig. 1 are distinguished by the same reference numbers provided with a double prime, a variant is schematized in which at least one of the turbines of the geothermic central is combined with an air ejector operated by the same natural steam coming from underground and destined to operate the turbine itself, said ejector being apt to take the place of the motor-compressor-extractor in the function of creating, before starting any one of the turbines of the geothermic central plant, even when all the turbines of said central are inactive, a sufficient degree of vacuum in the condenser to which the ejector is connected, so as to avoid the working of the turbine with a discharge to the atmosphere during the first phase of the starting.

It is, of course, understood that the ejector can also be applied either to all of the main turbines of the plant or to one or more of the auxiliary turbines (A') operating a reserve compressor-extractor. Conduit 1" carrying steam to turbine A" is controlled by an operatable intercepting valve 20 upstream of which is disposed the derivation conduit 21 leading to the intercepting valve 22 and thence to ejector Y, whose suction chamber is connected by means of conduit 23 and intercepting valve 24 to conduit 4" connecting the gas cooler D" annexed to condenser C", with general collector 13" of the uncondensable gases.

Steam after having worked in ejector Y freely discharges into the atmosphere through conduit 25 dragging with it the extracted air. In order to start the turbine, even when all the turbines installed in the geothermic central are inactive, valves 20, 15" and 16" are initially kept closed, while valve 22 admitting the steam to ejector Y is opened. Valve 24 is then opened and when in condenser C" a sufficient degree of vacuum has been attained to attract into it the water injection, valve 20 is opened, starting turbine A and compressor E". By opening valve 16" the normal working of the condenser by means of compressor-extractor E" is determined, so that after this it is possible to exclude injector Y by shutting valve 24 and afterwards valve 22. By the application of the ejector according to the present invention, the advantage is gained of eliminating the running of any one of the turbines of the geothermical central with a discharge in the atmosphere in the case in which said turbine should be started while all the machines of said central are at rest.

I claim:

1. A natural steam turbine plant comprising, in combination, at least two units, each unit including a turbine adapted to be driven by a mixture of steam and uncondensable gases, at least one gas pump for uncondensable gases having inlet means and outlet means, releasable coupling means connecting said turbine with said gas pump for driving the latter, at least one condenser having inlet means communicating with the respective turbine and outlet means for uncondensable gases, a suction conduit means connecting said outlet means of said condenser with said inlet means of said gas pump, and a closure valve in said suction conduit means; a connecting conduit means for connecting the suction conduit means of said units; and valve means located intermediate said connecting conduit means and the suction conduit means of each of said units and connected to said suction conduit means at a point located intermediate the respective closure valve and the outlet means of the respective condenser whereby where the gas pump of one of said units is disconnected from the associated turbine by said coupling means, and disconnected from the associated condenser by the associated closure valve, the condenser associated with the disconnected gas pump can be connected to the gas pump of the other unit through said connecting conduit means and said valve means and the operation of the turbine of said one unit can be continued.

2. A gas turbine plant as claimed in claim 1, wherein said releasable coupling means is releasable only while at a standstill for being moved into a releasing position disconnecting said gas pump from said turbine only when said turbine is at a standstill.

3. A gas turbine plant as claimed in claim 1, wherein said releasable coupling means is releasable under load for being moved into a releasing position while said turbine is in operation.

4. A natural steam turbine plant comprising, in combination, at least two units, each unit including a turbine adapted to be driven by a mixture of steam and uncondensable gases, at least one low pressure gas pump and at least one high pressure gas pump for uncondensable gases, each gas pump having inlet means and outlet means, the inlet means of said high pressure gas pump communicating with the outlet means of said low pressure gas pump, a multi-speed gear transmission having a high-speed gear stage connected to said high pressure pump and a low-speed gear stage connected to said low pressure pump, a releasable coupling means connecting said multi-speed gear transmission with said turbine for driving said gas pumps from said turbine, at least one condenser having inlet means communicating with the respective turbine and outlet means for uncondensable gases, a suction conduit means connecting said outlet means of said condenser with said inlet means of said low-pressure gas pump, and a closure valve in said suction conduit means; a connecting conduit means for connecting the suction conduit means of said units; and valve means located intermediate said connecting conduit means and the suction conduit means of each of said units and connected to said suction conduit means at a point located intermediate the respective closure valve and the outlet means of the respective condenser whereby when the gas pump of one of said units is disconnected from the associated turbine by said coupling means, and disconnected from the associated condenser by the associated closure valve, the condenser associated with the disconnected gas pump can be connected to the gas pumps of the other unit through said connecting conduit means and said valve means and the operation of the turbine of said one unit can be continued.

5. A turbine plant as claimed in claim 4, wherein said low-speed gear stage of said multi-speed gear transmission is a transmission shaft connecting said low pressure gas pump with said turbine in a direct drive.

6. A natural steam turbine plant comprising, in combination, at least two units, each unit including a turbine adapted to be driven by a mixture of steam and uncondensable gases, at least one gas pump for uncondensable gases having inlet means and outlet means, releasable coupling means connecting said turbine with said gas pump for driving the latter, at least one condenser having inlet means communicating with the respective turbine and outlet means for uncondensable gases, a suction conduit means connecting said outlet means of said condenser with said inlet means of said gas pump, and a closure valve in said suction conduit means; a connecting conduit means for connecting the suction conduit means of said units; and at least two valve means, each valve means being located intermediate said connecting conduit means with the suction conduit means of one of said units and connected to said suction conduit means at a point located intermediate the respective closure valve and the outlet means of the respective condenser whereby when the gas pump of one of said units is disconnected from the associated turbine by said coupling means, and disconnected from the associated condenser by the associated closure valve, the condenser associated with the disconnected gas pump can be connected to the gas pump of the other unit through said connecting conduit means and said valve means and the operation of the turbine of said one unit can be continued.

References Cited in the file of this patent

UNITED STATES PATENTS

| 41,964 | Newton et al. | Mar. 15, 1864 |
| 346,502 | Sanford | Aug. 3, 1886 |
| 770,264 | Cochrane | Sept. 20, 1904 |
| 1,093,145 | Pagel | Apr. 19, 1914 |
| 1,252,956 | Schmidt | Jan. 8, 1918 |
| 1,356,463 | Okun | Oct. 19, 1920 |
| 1,364,488 | Doble | Jan. 4, 1921 |
| 1,371,821 | Suczek | Mar. 15, 1921 |
| 1,458,737 | Suczek | June 12, 1923 |
| 1,611,256 | Suczek | Dec. 21, 1926 |
| 1,762,672 | Spennemann | June 10, 1930 |
| 1,777,239 | Weir | Sept. 30, 1930 |
| 2,221,969 | Gonzalez | Nov. 19, 1940 |
| 2,263,705 | Seippel | Nov. 25, 1941 |
| 2,432,177 | Sedille | Dec. 9, 1947 |

FOREIGN PATENTS

| 491,389 | Germany | Feb. 13, 1930 |
| 898 | Great Britain | Mar. 5, 1878 |
| 234,581 | Great Britain | June 4, 1925 |
| 11,508 | Holland | May 16, 1924 |